United States Patent
Metke et al.

(10) Patent No.: US 9,479,337 B2
(45) Date of Patent: Oct. 25, 2016

(54) METHOD AND APPARATUS FOR DERIVING A CERTIFICATE FOR A PRIMARY DEVICE

(71) Applicant: MOTOROLA SOLUTIONS, INC, Schaumburg, IL (US)

(72) Inventors: Anthony R Metke, Naperville, IL (US); Michael F Korus, Eden Prairie, MN (US); Thomas S Messerges, Schaumburg, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 224 days.

(21) Appl. No.: 14/541,296

(22) Filed: Nov. 14, 2014

(65) Prior Publication Data

US 2016/0142211 A1 May 19, 2016

(51) Int. Cl.
H04L 29/06 (2006.01)
H04L 9/32 (2006.01)

(52) U.S. Cl.
CPC ........... H04L 9/3263 (2013.01); H04L 9/3268 (2013.01); H04L 63/00 (2013.01); H04L 2209/76 (2013.01); H04L 2209/805 (2013.01)

(58) Field of Classification Search
CPC ... H04L 9/3263; H04L 63/00; H04L 9/3268; H04L 2209/74; H04L 2209/805
See application file for complete search history.

(56) References Cited

U.S. PATENT DOCUMENTS

| | | | | |
|---|---|---|---|---|
| 6,134,550 A * | 10/2000 | Van Oorschot | ......... | G06F 21/33 |
| 6,367,013 B1 * | 4/2002 | Bisbee | ................... | G06Q 20/00 713/158 |
| 6,792,530 B1 * | 9/2004 | Qu | ....................... | H04L 9/0844 380/279 |
| 6,983,364 B2 * | 1/2006 | Gougeon | ............. | G06Q 20/341 713/165 |
| 7,627,125 B2 * | 12/2009 | Lumsden | ............... | G06Q 20/02 380/277 |
| 7,743,409 B2 * | 6/2010 | Gonzalez | ................ | G06F 21/31 713/184 |
| 8,001,381 B2 * | 8/2011 | Metke | ................... | G06F 21/445 380/259 |
| 8,423,761 B2 * | 4/2013 | Guo | .................... | H04L 63/0823 713/156 |
| 8,532,295 B2 * | 9/2013 | Benteo | .................. | H04L 9/0869 380/255 |
| 8,688,976 B2 | 4/2014 | Busser | | |
| 2011/0258434 A1 | 10/2011 | Qiu | | |
| 2012/0185622 A1 * | 7/2012 | Capomaggio | ......... | G06F 13/387 710/62 |
| 2013/0061035 A1 | 3/2013 | Hook | | |
| 2013/0145151 A1 * | 6/2013 | Brown | .................. | H04L 9/3268 713/156 |
| 2013/0147511 A1 | 6/2013 | Koeberl | | |
| 2013/0176432 A1 | 7/2013 | Gupta | | |
| 2013/0311771 A1 | 11/2013 | Hoggan | | |

FOREIGN PATENT DOCUMENTS

WO 2010062452 A1 6/2010

OTHER PUBLICATIONS

Francisco Corella, "Smart Cards, TEEs and Derived Credentials", Sep. 25, 2014, Retrieved from https://pomcor.com/2014/09/25/smart-cards-tees-and-derived-credentials/.*

(Continued)

*Primary Examiner* — Chau Le (57) ABSTRACT

In a method, a secured link is established between a primary device and a secondary device, both of which are assigned to a user. The secondary device receives, on the secured link, a request for a derived certificate for the primary device and a public key generated by the primary device. The secondary device generates the derived certificate for the primary device based on an original certificate issued to the secondary device and transmits, on the secured link, the derived certificate to the primary device.

16 Claims, 5 Drawing Sheets

(56) References Cited

OTHER PUBLICATIONS

Francisco Corella,Techniques for Implementing Derived Credentials, Revised Sep. 13, 2012.
Hildegard Ferraiolo, Guidelines for Derived Personal Identity Verification Credentials, NIST SP 8-00-157, Mar. 2014.
Personal Identity Verification (PIV) of Federal Employees and Contractors DRAFT, FIDS PUB 201-2, Mar. 2011.
William E. Burr, Electronic Authentication Guideline, National Institute of Standards and Technology, Dec. 2011.
The Defense Department looks into its Mobile Future by Brad Grimes, FedTech publication, Mar. 5, 2014.

* cited by examiner

METHOD AND APPARATUS FOR DERIVING A CERTIFICATE FOR A PRIMARY DEVICE

BACKGROUND OF THE INVENTION

A digital certificate may be created in a public key infrastructure (PKI) and may be used to identify ownership of a public key as a part of a cryptographic protocol executed to authenticate an end entity (i.e., a user or device) and subsequently grant access to a service. In order to obtain the digital certificate from a PKI, the end entity typically sends a certificate signing request to a component (for example, a registration authority (RA) or a certificate authority (CA)) in a PKI. The certificate generated by the PKI certifies the ownership of a public key by the named subject of the certificate and binds an identity of the end entity to the public key by including the identity of the end entity and the public key in the certificate and signing the certificate with the private key of a trusted CA. The CA may include other information about the end entity in the certificate. For instance, the CA may include attributes that can be used to provide an indication of the applications and services that the end entity should be allowed to access, or other attributes of the end entity such as a role or rank, or group affiliation. Once generated, the digital certificate allows others (relying parties) to rely upon signatures or assertions made by a private key that corresponds to the public key in the certificate. The process of obtaining a certificate is referred to herein as certificate enrollment. Certificate enrollment may be a long and cumbersome process, depending on the security requirements of an enterprise associated with a given type of certificate. For this reason, certificates are generally issued for long periods of time, such as months or years.

There are instances where a device is shared by two or more users. In these instances, there are challenges associated with certificate issuance and management. Consider an example where an enterprise implements a device sharing arrangement such that a group of devices may be shared by a group of users and each user is randomly assigned a device from a pool of devices for a specific period, for example, at the beginning of a shift. In such a sharing arrangement, it may be operationally restrictive to ensure that a given user always uses a given device. In this example, a first user may use a device for a first shift and a second user may use the same device for a second shift. When a device is used by multiple users, a single certificate issued to the device cannot be used to identify the current user.

It is also infeasible to provision the shared device with certificates for each potential user of the device. Consider that if the certificates issued to users sharing a device are long lived (for example, the certificates are issued for several months or over a year), the shared device would have to store certificates for, in some cases, hundreds of users. If the shared device with certificates for multiple users is lost or stolen, the certificate for each user that is stored in the device would have to be revoked. Furthermore, because each user is set up to share multiple devices, a user would have at least one certificate on each shared device. When a user with a certificate on multiple shared devices is terminated by the enterprise, the user certificate may have to be removed from each of the shared devices. As an alternative, if the certificates issued are short lived (for example, the certificates are issued for a single shift), the users may have to go through a potentially lengthy and costly enrollment process at the beginning of each shift. The cost of the daily enrollment for each user is unacceptably high.

In addition to the challenges associated with certificate issuance and management in device sharing arrangements, a device may not have a user interface for enabling a user to logon and activate a certificate assigned to the user, making it difficult for a user of the device to obtain a certificate on the device. To overcome the obstacles associated with certificate issuance and management, a user of a device (referred to herein as the primary device) needing access a given service is also issued a secondary device. An example of the secondary device may include a smart badge that is configured to wirelessly communicate with the primary device via a wireless interface, for example, Bluetooth, Bluetooth Low Energy, or near field communications (NFC). Another example of the secondary device may include a personal identity verification (PIV) card or a smart card that may be configured to wirelessly communicate with the primary device via a wired or wireless interface or via a contact or contactless interface. Wired interfaces for a secondary device may use the ISO 7816 standard for contact based smart card communications.

In order to access, for example, a service or network, via the primary device, the user may pair the secondary device to the primary device (for example, via Bluetooth wireless communication, NFC wireless communication, or by a contact based/wired connection). Subsequent to pairing the devices, in some implementations, the secondary device may answer a challenge presented to the primary device when the primary device tries to access the service or network. In some implementations, subsequent to pairing the devices, the primary device may obtain credentials (referred to herein as "derived credentials") from a third party, wherein the secondary device is used to prove an identity of a user prior to the primary device obtaining the derived credentials. Subsequent to obtaining the "derived credentials", the primary device does not need be paired with the secondary device each time the primary device accesses the service or network. Instead, the primary device may use the derived credentials to access the service or network.

There may be instances where the user may need to obtain a user certificate on the primary device to access a service when both the primary device and the secondary device have no access to fixed infrastructure services. For example, during an emergency situation when both the primary device and the secondary device have no access to PKI services in the fixed infrastructure, the user may need to obtain a certificate for accessing a local service (e.g., a service on a local ad hoc network with no connectivity to the fixed infrastructure) using a previously obtained certificate issued to the secondary device. However, there is no current avenue for the primary device to obtain a certificate for accessing the local service while both the primary and secondary devices are off-line and have no access to fixed infrastructure services.

Accordingly, there is a need for an apparatus and method for deriving a certificate for the primary device while both the primary and secondary devices are off-line.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 1 is a block diagram of a system implemented in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to methods and apparatuses for deriving a certificate for a primary device. In a method, a secured link is established between the primary device and a secondary device, both of which are assigned to a user. The secondary device receives, on the secured link, a request for a derived certificate for the primary device and a public key generated by the primary device. The secondary device generates the derived certificate for the primary device based on an original certificate issued previously to the secondary device and transmits, on the secured link, the derived certificate to the primary device.

Figure 1:
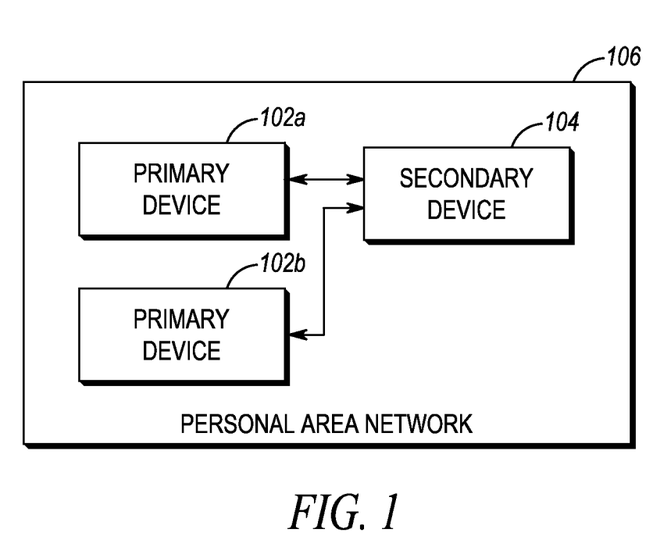

FIG. 1 is a block diagram of a system implemented in accordance with some embodiments. System 100 includes at least one primary device 102 (i.e., primary device 102a and primary device 102b) and a secondary device 104, each of which is assigned to a user, under the control of the user, and/or is part of the user's personal area network (PAN) 106. These devices are referred to herein as being assigned to the user or as being associated with the user. Primary device 102 may be, for example, a mobile or portable radio, on which a certificate is needed in order to access a given service. Secondary device 104 may be, for example, a smart device such as a smart badge or personal identity verification (PIV) card. When secondary device 104 is a smart badge, it may be configured to wirelessly communicate with primary device 102 via a wireless interface, for example, via a Bluetooth interface or near field communications (NFC) interface. When secondary device 104 is a PIV card, it may be configured to wirelessly communicate with primary device 102 via a wireless interface or it may be read by a contact based card reader on, or connected to, the primary device 102.

Secondary device 104 may be assigned to the user on a long term basis and may include an end entity/user certificate or certificate authority (CA) certificate (both of which are referred to herein as an original certificate). The original certificate identifies an end entity (for example, a user or a specific device), even when the original certificate is in the format of a CA certificate. The original certificate binds the end entity to a public key in the original certificate. In some instances, a private key associated with the public key in the original certificate may be stored in protective hardware on secondary device 104. The original certificate includes an attribute (referred to herein as a generation attribute) for indicating that secondary device 104 may use the original certificate as part of the process to generate another certificate (referred to herein as a derived certificate) for another device (for example, primary device 102) in PAN 106 or otherwise assigned to the user. In one embodiment, the generation attribute may be a certificate policy object identifier (CP OID) value reserved for the purpose of indicating that the certificate subject is authorized to issue the derived certificate.

As such, the derived certificate is based on the original certificate held on secondary device 104 and the derived certificate may be used by primary device 102 to access services. The derived certificate may be obtained by pairing primary device 102 with secondary device 104. Considering that pairing requires that both primary device 102 and secondary device 104 be within a predefined distance of each other, secondary device 104 may determine that it may generate the derived certificate subsequent to being paired with primary device 102. In some embodiments, in addition to being paired with primary device 102, secondary device 104 may require user authentication data before generating the derived certificate. The user authentication data may be a private key activation data such as a passcode (PIN) or a biometric reading such as finger print, voice or face reading. Such authentication data may be obtained by the secondary device directly from the user, or may be obtained from the primary device.

In some embodiments, in addition to being paired with primary device 102, secondary device 104 and primary device 102 may perform device certificate based authentication using device certificates issued to each of primary device 102 and secondary device 104 by one or more trusted third parties. The device certificate issued to secondary device 104 may include authorization attributes that primary device 102 may use to determine if secondary device 104 is authorized to issue one or more derived certificates and the device certificate issued to primary device 102 may include authorization attributes that secondary device 104 may use to determine if primary device 102 is authorized to receive one or more derived certificates. For instance, when establishing a secured link with primary device 102, secondary device 104 may request that primary device 102 send a device certificate, issued by an agency to primary device 102, before secondary device 104 generates a derived certificate for primary device 102.

In one embodiment, the secondary device may further compare attributes in the device certificate issued to primary device 102 with attributes in the original certificate issued to secondary device 104 and attributes in local policy data for secondary device 104. The local policy data stored on secondary device 104 may include rules stored on secondary device 104, wherein these rules are used to determine, based on attributes in the device certificate issued to primary device 102 and optionally attributes in the original certificate issued to secondary device 104, whether or not a derived certificate can be issued. Secondary device 104 may only issue a derived certificate requested by primary device 104 if secondary device 104 determines that the attributes in the device certificate issued to primary device 102 are appropriate based on the attributes in the original certificate issued to secondary device 104 and/or the local policy data. For example, if primary device 102 has a device certificate that indicates that it has been issued to a first precinct, the original certificate issued to secondary device 104 indicates that it has been issued to a second precinct, and the local policy data indicates that secondary device 104 may only issue derived certificates to devices assigned to the same precinct, then the secondary device 104 would determine that it is not to issue derived certificates to primary device 102. In another example, the local policy data stored on secondary device 104 may directly indicate that derived certificates may only be issued to primary devices issued to the first precinct. In another example, the local policy data stored on secondary device 104 may indicate that secondary device 104 is to issue a derived certificate to a primary device based on a capability of the primary device. For instance, the local policy data stored on secondary device 104 may indicate that secondary device 104 is to issue a derived certificate to only primary devices that have a hardware-backed key storage, as could be indicated by the device certificate issued to primary device 102.

In generating the derived certificate, secondary device 104 leverages fields in the original certificate. In addition, secondary device 104 may also enforce predefined certificate constraint rules when generating the credentials/attributes for one or more fields of the derived certificate. These certificate constraint rules that constrain how certificate are issued may simply be referred to as certificate constraints. For example, secondary device 104 may enforce certificate constraint rules for indicating that the generation attribute cannot be included in the derived certificate. By enforcing certificate constraint rules that indicate that the generation attribute cannot be included in the derived certificate, a device to which a derived certificate is issued will be unable to issue a second derived certificate. Secondary device 104 may also enforce certificate constraint rules for indicating a validity period of the derived certificate. For example, secondary device 104 may enforce certificate constraint rules for indicating that the derived certificate may be valid for not longer than eight hours, taking an example where the derived certificate is to be used by a shift worker. In one embodiment, secondary device 104 may be configured to use an attribute in the original certificate to determine the necessary constraints/certificate constraint rules that it will enforce, such as the maximum allowable duration for a validity period of the derived certificate.

In generating the derived certificate, secondary device 104 may evaluate a controlling attribute in the original certificate to determine allowable attributes for the derived certificate. For example, an allowable derived certificate validity period may be determined by a controlling attribute in the original certificate. In another example, secondary device 104 may use a certificate policy stored in the original certificate to determine a set of certificate policies that would be allowable in a derived certificate. Secondary device 104 may access the certificate policy stored in the original certificate via a look up table on the secondary device 104. In generating the derived certificate, secondary device 104 may also determine one of attributes and limits for attributes for the derived certificate based on attributes in the device certificate that secondary device 104 received from primary device 102.

Each certificate derived from the original certificate may be constrained by the original certificate in that one or more fields in the derived certificate is determined based on the same field in the original certificate. For instance, the same value for the subject (distinguished name) or user name, subject alternative name, key usage, extended key usage, public key algorithm, signature algorithm, and private extensions fields in the original certificate may be included in the derived certificate. The value for the issuer in the derived certificate may be the same as the subject in the original certificate. The CP OIDs from the original certificate may also be included in the derived certificate. Secondary device 104 may also enforce certificate constraint rules for indicating that the derived certificate may include a further CP OID (referred to herein as a derived certificate policies object identifier (CP OID)) for indicating that it is a derived certificate. Alternatively, an attribute other than the CP OID may be included in the derived certificate to indicate that it is a derived certificate. In one embodiment, multiple CP OID values may be used to indicate that the certificate is a derived certificate, where each individual value also indicates a level of assurance (LOA), where the LOA of the derived certificate is determined by a minimum of the LOA of the original certificate and the LOA of the device certificate issued to primary device 102. Secondary device 104 may also enforce certificate constraint rules for defining the validity period for the derived certificate as being shorter than or equal to that of the original certificate.

The signature in the original certificate is generated by a certificate authority (CA) in a public key infrastructure (PKI), wherein the CA uses its private key to sign the original certificate. The CA that issues the original certificate is sometimes referred to herein as the original CA. Considering that the derived certificate is generated from the original certificate, the derived certificate is signed with a private key corresponding to the public key in the original certificate. As such, in generating the derived certificate, secondary device 104 functions as a CA. As is known in the art, a certificate issued to a CA is identifiable by a constraint known as a "Basic Constraint" which includes an attribute for indicating whether the certificate is issued to a CA (i.e., whether the certificate is a CA certificate) or whether the certificate is issued to a non-CA/end entity (i.e., whether the certificate is an end entity certificate).

When the original certificate is an end entity certificate and when secondary device 104 generates the derived certificate, the certificate chain from the original CA to the derived certificate will include two end entity certificates. In such a case, when the derived certificate is presented to a relying party to access a service, the relying party is configured to identify that the original certificate may generate the derived certificate and that derived certificate is derived from the original certificate. The relying party is also configured to use the end entity (original) certificate to validate the derived certification. For example, in validating the certificate chain for the derived certificate, the relying party is configured to accept a certificate chain with two end entity certificates and to ensure that the generation attribute (for example, a CP OID) is included in the original certificate and that the derived CP OID or another derived attribute is included in the derived certificate. By ensuring that the generation attribute is included in the original certificate, the relying party can verify that the original certificate is indeed authorized to generate the derived certificate. Also by ensuring that the derived CP OID or the other derived attribute is included in the derived certificate, the relying party can verify that the certificate chain with two end entity certificates is valid.

The relying party may also enforce other rules when validating the derived certificate. For instance, the relying party may enforce rules for ensuring the assurance level(s) of primary device 102 and/or secondary device 104 and rules for ensuring that the correct CP OIDs are included in the derived certificate. The relying party may also enforce rules for ensuring that the derived certificate includes certificate policies with an equal or lower assurance level than that of the original certificate. In addition, the relying party may perform device authentication with primary device 102 to determine if primary device 102 is authorized to use a derived certificate prior to accepting the derived certificate as part of a subsequent user authentication.

In some instances, the original certificate may be a CA certificate instead of an end entity certificate. In these instances, the CA certificate may be constrained so that only approved derived certificates can be generated from the CA certificate. For example, the CA certificate may be constrained by the name, path length and CP OID in the CA certificate. In this example, the subject in the derived certificate generated by CA certificate will be the same as that in the CA certificate, the path length in the CA certificate specifies the number of generations of derived certificates that can be generated from the CA certificate, and the CP OID in the CA certificate may be used to enforce certificate constraint rules for indicating, for example, that the derived certificate cannot have more privileges than the original certificate. In one example the name constraint in the original certificate may allow some variation in the derived certificate. For example, an original certificate issued to a subject of john.smith@person.org may be constrained to allow a derived certificate issued to subjects of the form device1.john.smith@person.org and device2.john.smith@person.org, but not server.john.smith@person.org, or george.smith@person.org.

When the original certificate is a CA certificate, after the derived certificate is presented to a relying party, the relying party may determine that the original certificate is a CA certificate, authenticate the original certificate, and validate at least one field in the derived certificate based on at least one field in the CA certificate that is configured to restrict attributes of an associated field in the derived certificate. Such fields are commonly known as constraint fields, and an original certificate may include standard constraints, such as name constraints, path length constraints, and policy constraints. An original certificate may further include new constraints such as a duration constraint. Note, other constraints are inherent in the original certificate and do not need to be explicitly specified, such as the constraints on the attributes for the subject (distinguished name) or user name, issuer, subject alternative name, key usage, extended key usage, public key algorithm, signature algorithm, and private extension fields.

In an embodiment, secondary device 104 (for example, a smart badge or a wearable device consisting of credentials of a smart badge) may be paired with one or more primary device 102 in PAN 106 or otherwise assigned to the user. While pairing each primary device 102 with secondary device 104, if necessary, primary device 102 transmits one of user authentication data (for example, a PIN or biometric information) or a device certificate to secondary device 104. Based on pairing, device certificate exchange, and/or the user authentication data received from primary device 102, secondary device 104 authenticates the user of primary device 102. Subsequent to the user of primary device 102 being authenticated by secondary device 104, primary device 102 may generate a public and private key pair and may transmit, via a secured link established by the pairing process, a request for a derived certificate to secondary device 104. The request may include the public key generated on primary device 102 and, optionally, the PIN entered by the user.

Subsequent to receiving the request for a derived certificate or just a public key, secondary device 104 may generate a derived certificate, wherein predefined fields in the derived certificate (for example the, subject or user name, private extensions and CP OIDs) are copied from an original certificate issued to secondary device 104. The subject field in the original certificate is copied to the issuer field of the derived certificate. In one embodiment, the subject key identifier of the original certificate is copied to an authority key identifier field of the derived certificate. The public key generated on primary device 102 is copied to the public key field in the derived certificate. The derived certificate may include a derived CP OID or another attribute for indicating it is a derived certificate. In addition, based on local certificate constraint policies/rules, the CP OID in the derived certificate may be changed to indicate that the derived certificate includes certificate policies with an equal assurance level or a lower assurance level than the certificate policies included in the original certificate. The derived certificate is signed with a private key corresponding to a public key in the original certificate. Subsequent to generating the derived certificate, secondary device 104 transmits, via the secured link, the signed derived certificate and certificate chain to primary device 102, where the certificate chain includes at least one of the original certificate, the original CA certificate, and any other necessary CA certificates.

At this point, primary device 102 may use the derived certificate to perform user authentication with a service provider (relying party). When an operation is executed on primary device 102 and the operation requires access to a service that requires authentication, primary device 102 transmits the derived certificate and optionally the certificate chain for the derived certificate to the relying party during communication with the relying party in order to enable primary device 102 to access a service provided by the relying party. In one embodiment, the relying party authenticates the user by standard chain validation (i.e., by first validating the original certificate with the public key in the original CA certificate and verifying that the derived certificate is signed by the original certificate) and then ensures that primary device 102 has the private key associated with the public key included in the derived certificate. In authenticating the certificate chain for the derived certificate, the relying party may determine that the derived certificate is derived because it includes the derived CP OID, an attribute that indicates that it is a derived certificate and because the original certificate in the certificate chain includes the generation attribute.

In another embodiment, the relying party may determine that the certificate from primary device 102 is a derived certificate that is subordinate to the original certificate (i.e., the derived certificate includes a policy that states that the original certificate is an end entity certificate (not a CA certificate) and the original certificate indicates that the end entity assigned the original certificate is allowed to generate the derived (subordinate) certificate under various conditions). The relying party may also ensure that the predefined fields in the derived certificate match predefined fields in the original certificate. The relying party may optionally ensure that the certificate policy in the derived certificate indicates all or a subset of privileges or an equal or lower assurance.

In another embodiment, subsequent to being paired with the secondary device 104, primary device 102 may transmit, to secondary device 104 via the secured link, a request for a user certificate (i.e., the original certificate) and the certificate chain for the original certificate. In response to receiving the original certificate and certificate chain for the original certificate from secondary device 104, primary device 102 generates an unsigned, derived certificate, wherein the unsigned derived certificate may include a public key for primary device 102. In this case, primary device 102 returns the unsigned derived certificate to secondary device 104 for secondary device 104 to sign with the private key associated with the public key contained in the original certificate.

In an embodiment, primary device 102 may not have sufficient entropy to securely generate a public key pair. In this embodiment, secondary device 104 may generate a key pair associated with the derived certificate and send the private key, the derived certificate, and any other certificates needed for chaining to a trust anchor, to primary device 102, in response to a request for a derived certificate from primary device 102. The secondary device 104 may make the determination that primary device 102 may not have sufficient entropy based on attributes in the device certificate issued to primary device. In the embodiment where primary device 102 generates the public/private key pair for primary device 102, when primary device 102 generates the unsigned derived certificate, the unsigned derived certificate includes the public key from the public/private key pair generated on primary device 102.

In generating the unsigned derived certificate, primary device 102 copies predefined fields (for example the subject or user name, private extensions and CP OIDs) from the original certificate received from secondary device 104 into the unsigned derived certificate. The unsigned derived certificate may also include an attribute for indicating it is a derived certificate. Based on local policies, the CP OID in the unsigned derived certificate may be changed to indicate that the unsigned derived certificate includes certificate policy with a lower assurance level than that of the original certificate. The unsigned derived certificate may also include a shorter validity period than that of the original certificate.

In one embodiment, primary device 102 may send, to secondary device 104, a standard certificate signing request (CSR) or a CSR containing the public key generated by primary device, where other fields of the CSR are left blank, omitted, or filled with default attributes. When the message sent by primary device 102 is a CSR, secondary device 104 would fill in any omitted, or empty attributes, or overwrite any default attributes.

Secondary device 104 may be comprised of a personal computer and smartcard, where the smartcard may be used to generate or sign the derived certificate and the personal computer may be used as a communication conduit between the primary device 102 and the smartcard. In this embodiment, primary device 102 and the personal computer may be securely paired. As used herein, the smartcard may be a portable device with a secure processing element, a secure storage, and at least one of an NFC interface, a bluetooth interface, and a contact based interface.

Primary device 102 transmits data associated with the derived certificate that is to be signed, which may include, for example, the unsigned derived certificate itself or a hash of the unsigned derived certificate and optionally, any activation data provided by the user, to secondary device 104. In cases where the data to be signed consists of a hash of the unsigned derived certificate, the signing function on secondary device 104 would omit a hash generation step commonly known as part of generating a signature. Secondary device 104 generates a derived certificate signature either by signing the unsigned derived certificate with a private key associated with the public key in the original certificate or by using the hash of the unsigned derived certificate and the private key associated with the public key in the original certificate. Secondary device 104 transmits the signature or the signed derived certificate to primary device 102. At this point, primary device 102 may use the signed derived certificate or append the signature to the unsigned derived certificate to generate a derived certificate and may use the derived certificate to perform user authentication with a service provider.

When an operation is executed on primary device 102 and the operation requires access to a service requiring authentication and provided by a relying party (service provider), to enable primary device 102 to access the service, primary device 102 transmits the derived certificate and the certificate chain for the derived certificate to the relying party during communication with the relying party. The relying party authenticates the user by validating the original certificate and verifying that the derived certificate is signed with a private key corresponding to the public key in the original certificate (in other words, via standard chain validation when the original certificate is a CA certificate). The relying party then ensures that primary device 102 has the private key associated with the derived certificate by running a certificate-based authentication protocol, or public-key-based challenge and response protocol. The certificate-based authentication protocol may be a standard transport layer security/secure sockets layer (TLS/SSL) or IP Security Key Exchange (IKE) protocols. The public-key-based challenge and response protocol may be executed on top of an existing TLS/SSL session.

The relying party may be notified in the original certificate that primary device 102 is responsible for generating an unsigned derived certificate or the derived certificate may also include an attribute that indicates that primary device 102 generated the unsigned derived certificate. When the relying party is notified that primary device 102 generated the unsigned derived certificate, the relying party may perform a second validation of primary device 102 to ensure that primary device 102 is allowed to generate an unsigned derived certificate. For instance, when there is a policy that unsigned derived certificates may only be generated by primary devices with a high assurance level, the relying party may check the assurance level of primary device 102 to ensure that it has the features required at the high assurance level.

In addition to generating the derived certificate, secondary device 104 may perform other functions including, for example, providing primary device 102 with Bluetooth bonding data that may be used to perform PAN pairing with another secondary device (not shown) that is associated with the user, after secondary device 104 is no longer available on PAN 106, or providing user profile data that can be used by primary device 102 to load specific user configuration settings on primary device 102.

Figure 2:
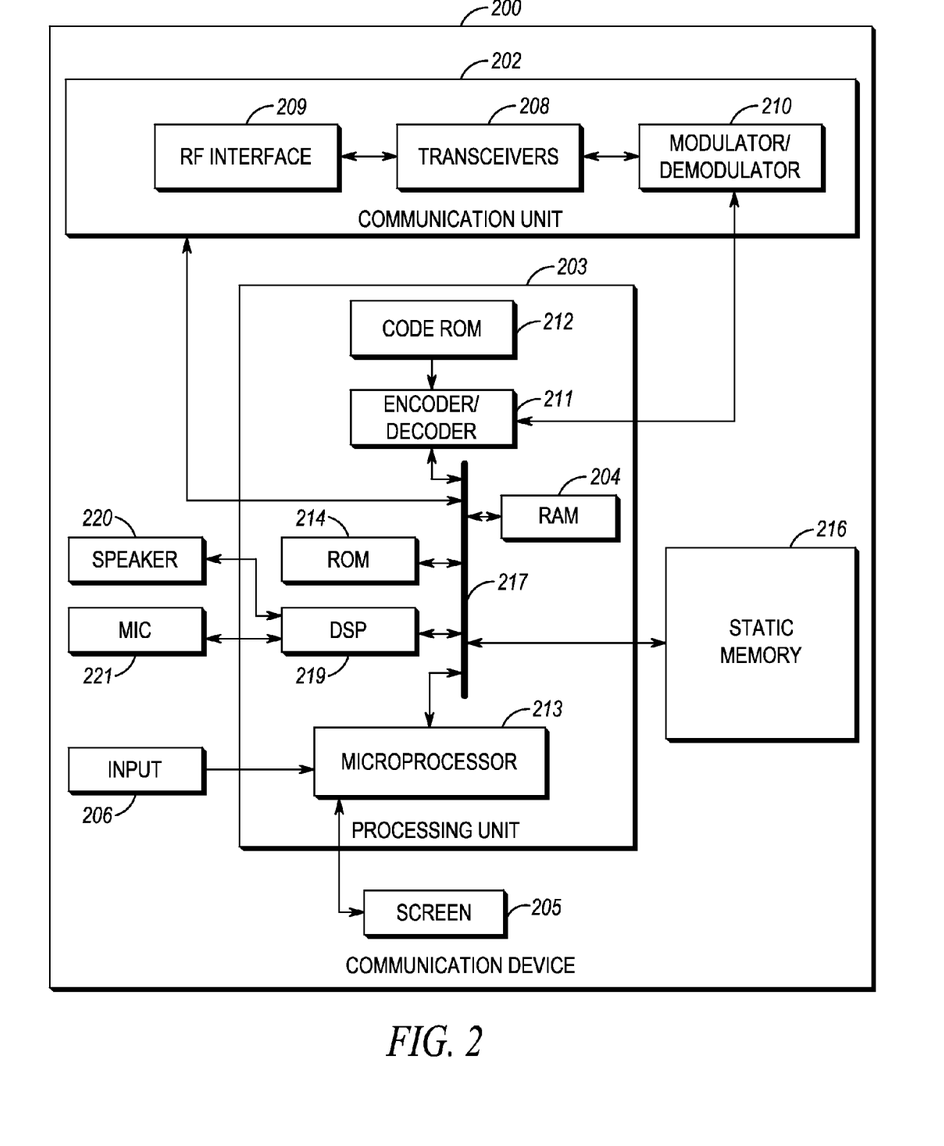
FIG. 2 is a block diagram of a communication device used in accordance with some embodiments.

FIG. 2 is a block diagram of a communication device 200, such as primary device 102, used in accordance with some embodiments. Communication device 200, for example, may include a communications unit 202 coupled to a common data and address bus 217 of a processor 203. Communication device 200 may also include an input unit (e.g., keypad, pointing device, etc.) 206, an output transducer unit (e.g., speaker) 220, an input transducer unit (e.g., a microphone) (MIC) 221, and a display screen 205, each coupled to be in communication with the processor 203.

The processor 203 may include, that is, implement, an encoder/decoder 211 with an associated code read-only memory (ROM) 212 for storing data for encoding and decoding voice, data, control, or other signals that may be transmitted or received by communication device 200. The processor 203 may further include one or more of a microprocessor 213 and digital signal processor (DSP) 219 coupled, by the common data and address bus 217, to the encoder/decoder 211 and to one or more memory devices, such as a ROM 214, a random access memory (RAM) 204, and a static memory 216. One or more of ROM 214, RAM 204 and flash memory 216 may be included as part of processor 203 or may be separate from, and coupled to, the processor 203. The encoder/decoder 211 may be implemented by microprocessor 213 or DSP 219, or may be implemented by a separate component of the processor 203 and coupled to other components of the processor 203 via bus 217.

Communications unit 202 may include an RF interface 209 configurable to communicate with network components, and other user equipment within its communication range. Communications unit 202 may include one or more broadband and/or narrowband transceivers 208, such as an Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. Communications unit 202 may also include one or more local area network or personal area network transceivers such as Wi-Fi transceiver perhaps operating in accordance with an IEEE 802.11 standard (e.g., 802.11a, 802.11b, 802.11g), a Bluetooth transceiver or a near field communication (NFC) transceiver. The transceivers may be coupled to a combined modulator/demodulator 210 that is coupled to the encoder/decoder 211.

Figure 4:
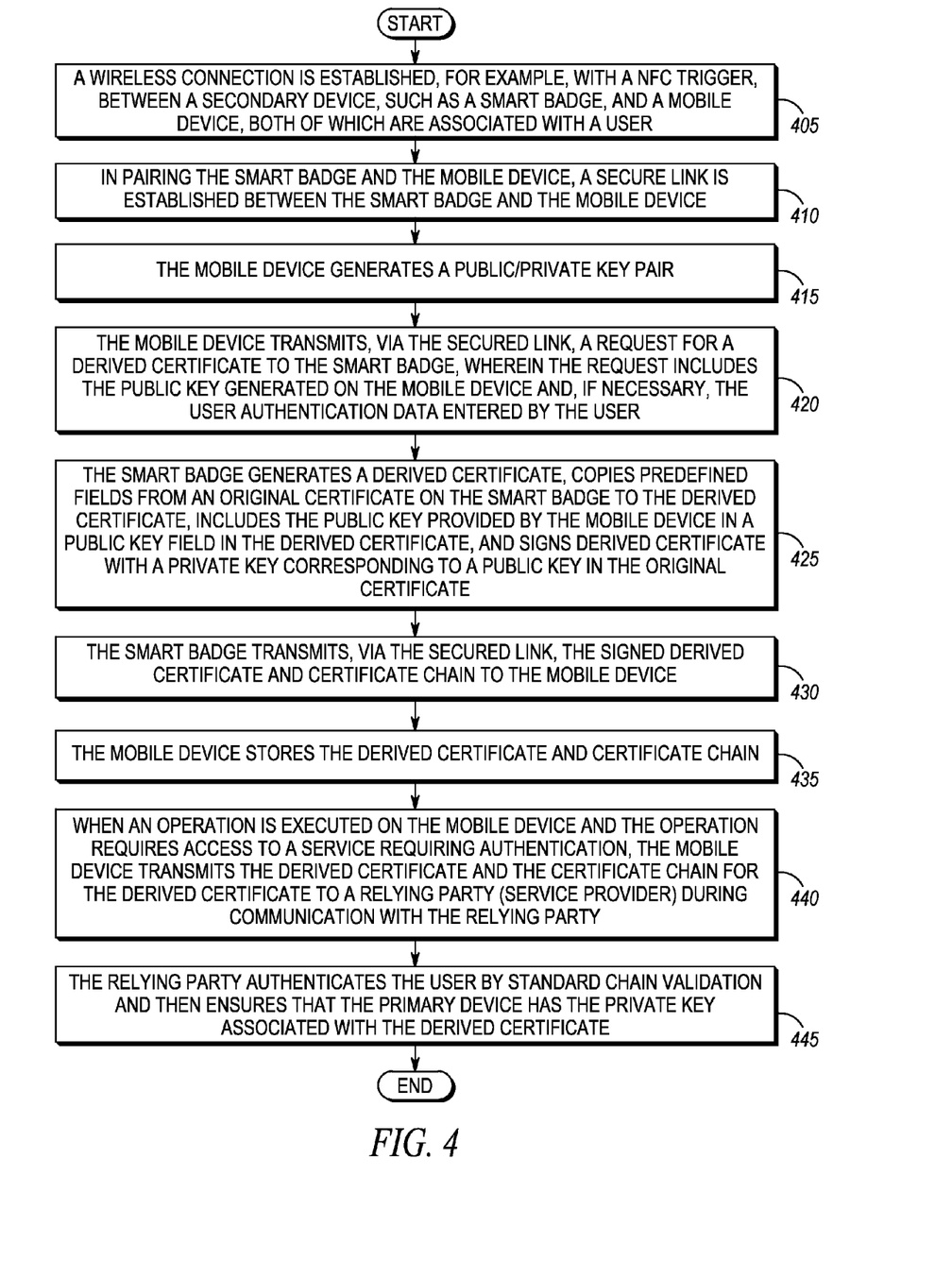
FIG. 4 is a flow diagram for generating and obtaining a derived certificate in accordance with some embodiments.
Figure 5:
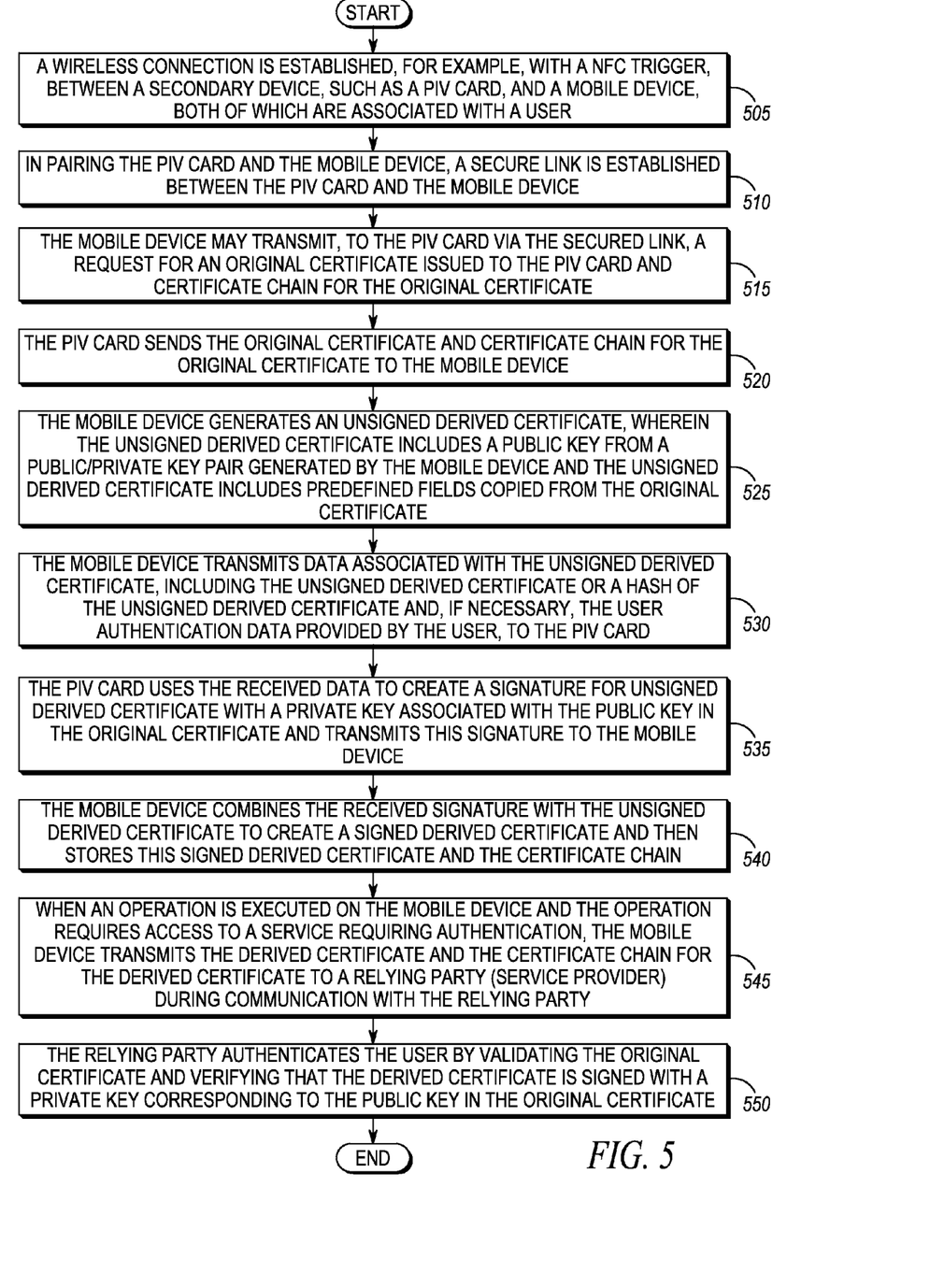
FIG. 5 is another flow diagram for generating and obtaining a derived certificate in accordance with some embodiments.

The one or more memory devices 212, 214, 216 store code for decoding or encoding data such as control, request, or instruction messages, channel change messages, and/or data or voice messages that may be transmitted or received by device 200 and other programs and instructions that, when executed by the processor 203, provide for the device 200 (for example, primary devices 102) to perform the functions and operations described herein as being performed by such a device, such as the implementation of the encoder/decoder 211 and one or more of the steps set forth in FIG. 4 and FIG. 5.

Figure 3:
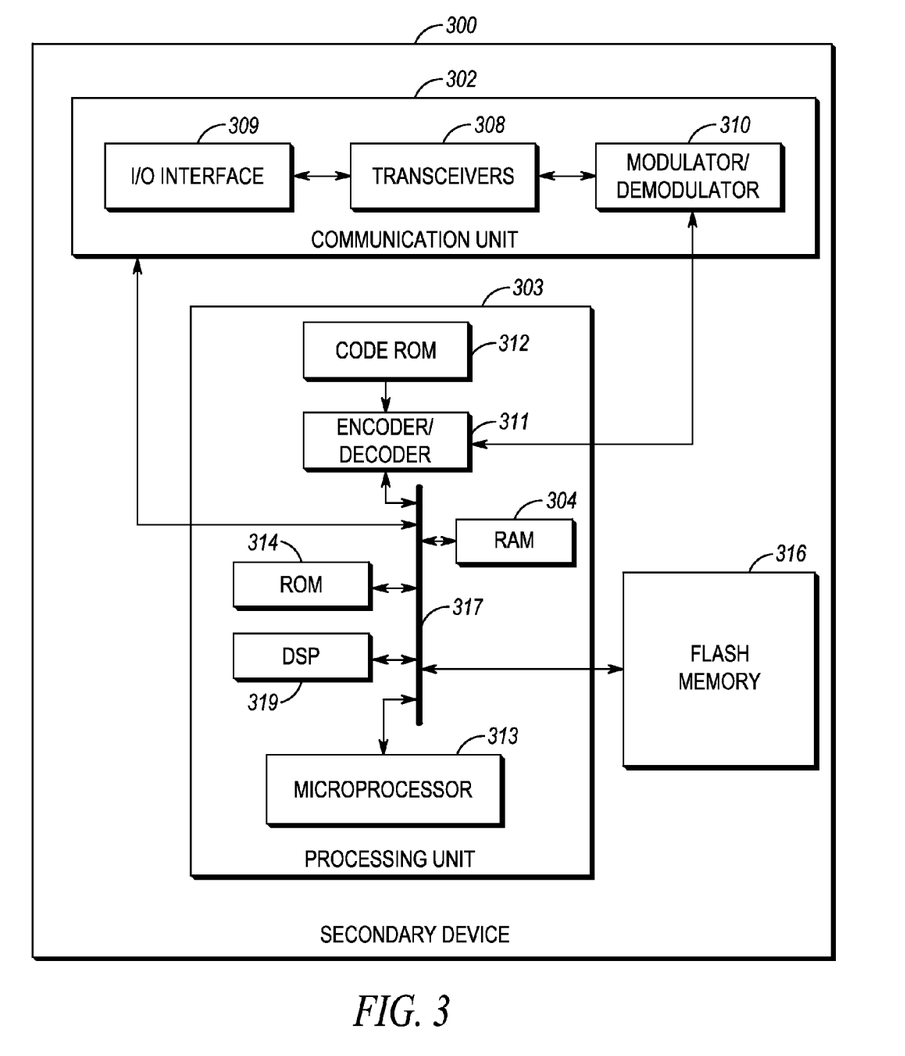
FIG. 3 is a block diagram of another device used in accordance with some embodiments.

FIG. 3 is a block diagram of a device 300, such as secondary device 104, used in accordance with some embodiments. Device 300, for example, may include a communications unit 302 coupled to a common data and address bus 317 of a processor 303. The processor 303 may include, that is, implement, an encoder/decoder 211 with an associated code read-only memory (ROM) 212 for storing data for encoding and decoding data, control, or other signals that may be transmitted or received by device 300. The processor 303 may further include one or more of a microprocessor 313 and digital signal processor (DSP) 319 coupled, by the common data and address bus 317, to the encoder/decoder 311 and to one or more memory devices, such as a ROM 314, a random access memory (RAM) 304, and a static memory 316. One or more of ROM 314, RAM 304 and flash memory 316 may be included as part of processor 303 or may be separate from, and coupled to, the processor 303. The encoder/decoder 311 may be implemented by microprocessor 313 or DSP 319, or may be implemented by a separate component of the processor 303 and coupled to other components of the processor 303 via bus 317.

Communications unit 302 may include an input/output (I/O) interface 309 configurable to communicate with network components, and other user equipment within its communication range. Communications unit 302 may include one or more broadband and/or narrowband transceivers 308. Communications unit 302 may also include one or more local area network or personal area network transceivers such as Wi-Fi transceiver perhaps operating in accordance with an IEEE 802.11 standard (e.g., 802.11a, 802.11b, 802.11g), a Bluetooth transceiver or NFC transceiver. The transceivers may be coupled to a combined modulator/demodulator 310 that is coupled to the encoder/decoder 311.

The one or more memory devices 312, 314, 316 store code for decoding or encoding data such as control, request, or instruction messages, channel change messages, and/or data messages that may be transmitted or received by device 300 and other programs and instructions that, when executed by the processor 303, provide for the device 300 (for example, secondary devices 102) to perform the functions and operations described herein as being performed by such a device, such as the implementation of the encoder/decoder 311 and one or more of the steps set forth in FIG. 4 and FIG. 5.

FIG. 4 is a flow diagram for obtaining a derived certificate in accordance with some embodiments. At 405, a wireless connection is established, for example, with a NFC trigger, between a secondary device, such as a smart badge, and a primary device, such as a mobile device, wherein both the secondary device and the mobile device are associated with a user. During, or before, the pairing process, if necessary, the mobile device may prompt the user to enter user authentication data such as a password (PIN) or biometric information and may receive the authentication data from the user via a trusted interface. At 410, in pairing the smart badge and the mobile device, a secure link is established between the smart badge and the mobile device. At 415, the mobile device generates a public and private key pair. At 420, the mobile device transmits, via the secured link, a request for a derived certificate to the smart badge, wherein the request includes the public key generated on the mobile device and, if necessary, the user authentication data entered by the user and/or a device certificate issued by a third party, for example, an agency.

At 425, the smart badge generates a derived certificate, copies predefined fields from an original certificate on the smart badge to the derived certificate, includes the public key provided by the mobile device in a public key field in the derived certificate, and signs derived certificate with a private key corresponding to a public key in the original certificate. At 430, the smart badge transmits, via the secured link, the signed derived certificate and certificate chain to the mobile device. At 435, the mobile device stores the derived certificate and certificate chain.

At 440, when an operation is executed on the mobile device and the operation requires access to a service requiring authentication, the mobile device transmits the derived certificate and the certificate chain for the derived certificate to a relying party (service provider) during communication with the relying party. At 445, the relying party authenticates the user by standard chain validation (i.e., by first validating the original certificate and verifying that the derived certificates is signed by the original certificate) and then ensures that the primary device has the private key associated with the derived certificate.

FIG. 5 is another flow diagram for obtaining a derived certificate in accordance with some embodiments. At 505, a wireless connection is established between a secondary device, such as a PIV card, and a mobile device, both of which are associated with a user. During, or before, the pairing process, if necessary, the mobile device may prompt the user to enter user authentication data such as a password (PIN) or biometric information and may receive the user authentication data from the user via a trusted interface. At 510, in pairing the PIV card and the mobile device, a secure link is established between the PIV card and the mobile device. At 515, the mobile device may transmit, to the PIV card via the secured link, a request for an original certificate issued to the PIV card and certificate chain for the original certificate, wherein the request may include the public key generated on the mobile device and, if necessary, the user authentication data entered by the user and/or a device certificate issued by a third party, for example, an agency. At 520, the PIV card sends the original certificate and certificate chain for the original certificate to the mobile device.

At 525, the mobile device generates an unsigned derived certificate, wherein the unsigned derived certificate includes a public key from a public/private key pair generated by the mobile device and the unsigned derived certificate includes predefined fields copied from the original certificate. At 530, the mobile device transmits data associated with the unsigned derived certificate, including the unsigned derived certificate or a hash of the unsigned derived certificate and, if necessary, the user authentication data provided by the user, to the PIV card. At 535, the PIV card uses the received data to create a signature for the unsigned derived certificate with a private key associated with the public key in the original certificate and transmits this signature to the mobile device. At 540, the mobile device combines the received signature with the unsigned derived certificate to create a signed derived certificate and then stores this signed derived certificate and the certificate chain.

At 545, when an operation is executed on the mobile device and the operation requires access to a service requiring authentication, the mobile device transmits the derived certificate and the certificate chain for the derived certificate to a relying party (service provider) during communication with the relying party. At 550, the relying party authenticates the user by validating the original certificate and verifying that the derived certificate is signed with the private key corresponding to the public key in the original certificate.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
    establishing a secured link between a primary device and a secondary device, wherein both the primary device and the secondary device are assigned to a user;
    transmitting, by the primary device on the secured link, a request for an original certificate issued to the secondary device;
    receiving, by the primary device, the original certificate from the secondary device;
    responsive to the receiving the original certificate, generating, by the primary device, an unsigned derived certificate for the primary device based on the original certificate and including a public key for the primary device in the unsigned derived certificate;
    transmitting, by the primary device, data associated with the unsigned derived certificate to the secondary device;
    receiving, by the primary device, a derived certificate signature from the secondary device, wherein the derived certificate signature is created with a private key associated with a public key in the original certificate;
    combining, by the primary device, the derived certificate signature with the unsigned derived certificate to create a derived certificate; and
    using, by the primary device, the derived certificate to access a service provided by a relying party.

2. The method of claim 1, wherein the public key is part of a public and private key pair generated on one of:
    the primary device; and
    the secondary device and received by the primary device with the original certificate.

3. The method of claim 1, wherein the generating comprises:
    copying predefined fields from the original certificate to predefined fields in the derived certificate; and
    enforcing a certificate constraint rule for at least one of:
        generating attributes for at least one field in the derived certificate;
        generating a certificate policy object identifier in the derived certificate for indicating that the derived certificate includes certificate policies with an equal assurance level or a lower assurance level than certificate policies included in the original certificate; and
        including a derived certificate policy object identifier in the derived certificate.

4. The method of claim 1, wherein the original certificate includes a generation attribute for indicating that the secondary device may use the original certificate to generate the derived certificate for another device assigned to the user.

5. The method of claim 1, wherein transmitting data associated with the unsigned derived certificate to the secondary device includes transmitting at least one of user authentication data provided by the user and a device certificate issued by a third party.

6. An apparatus comprising:
    a primary device; and
    a secondary device, wherein both the primary device and the secondary device, are assigned to a user and are configured to establish a secured link;
    wherein, subsequent to establishing the secured link, the primary device is configured perform functions for transmitting, to the secondary device, one of: a request for a derived certificate for the primary device and a request for an original certificate issued to the secondary device;
    wherein the secondary device is configured to:
        one of receive the request for the derived certificate for the primary device and receive the request for the original certificate;
        in response to receiving the request for the derived certificate, generate the derived certificate for the primary device based on the original certificate and transmit the derived certificate to the primary device; and
        in response to receiving the request for the original certificate, transmit the original certificate to the primary device,
    wherein subsequent to receiving, by the primary device, the original certificate from the secondary device, the primary device is configured to generate an unsigned derived certificate for the primary device based on the original certificate, include a public key for the primary device in the unsigned derived certificate and transmit data associated with the unsigned derived certificate to the secondary device;
    wherein subsequent to receiving the data associated with the unsigned derived certificate, the secondary device is configured to create a signature using the data associated with the unsigned derived certificate and a private key associated with a public key in the original certificate and transmit the derived certificate to the primary device; and
    wherein the primary device is configured to use the derived certificate to access a service provided by a relying party.

7. The apparatus of claim 6, wherein:
    in generating the derived certificate, the secondary device is configured to copy predefined fields from the original certificate to predefined fields in the derived certificate and copy the public key for the primary device to a public key field in the derived certificate; and
    in generating the unsigned derived certificate, the primary device is configured to copy predefined fields from the original certificate to predefined fields in the derived certificate and copy the public key for the primary device to the public key field in the derived certificate.

8. The apparatus of claim 6, wherein:
    in generating the derived certificate, the secondary device is configured to enforce a certificate constraint rule to at least one of:
        generate attributes for at least one field in the derived certificate;
        generate a certificate policy object identifier in the derived certificate for indicating that the derived certificate includes certificate policies with an equal assurance level or a lower assurance level than certificate policies included in the original certificate; and include a derived certificate policy object identifier in the derived certificate; and in generating the unsigned derived certificate, the primary device is configured to execute the certificate constraint rule to at least one of:

generate attributes for at least one field in the unsigned derived certificate;

generate a certificate policy object identifier in the unsigned derived certificate for indicating that the unsigned derived certificate includes certificate policies with an equal assurance level or a lower assurance level than certificate policies included in the original certificate; and include a derived certificate policy object identifier in the unsigned derived certificate.

9. The apparatus of claim 6, wherein at least one of the request for a derived certificate for the primary device and the request for an original certificate includes at least one of user authentication data provided by the user or a device certificate issued by an agency.

10. The apparatus of claim 6, wherein the public key for the primary device is part of a public and private key pair generated on one of:

the primary device; and the secondary device, wherein the public and private key pair generated on the secondary device is received by the primary device with the original certificate.

11. The apparatus of claim 6, wherein the relying party is configured to:

receive the derived certificate to enable the primary device to access the service;

determine that the original certificate is one of an end entity certificate and a certificate authority certificate issued to an end entity;

validate the derived certificate using one of the end entity certificate and the certificate authority certificate; and enforce rules associated with the derived certificate based on one of the end entity certificate and the certificate authority certificate.

12. The apparatus of claim 11, wherein in validating the relying party is configured to:

determine that the original certificate is the end entity certificate;

authenticate the original certificate;

verify that the original certificate is authorized to generate the derived certificate; and validate that the derived certificate is generated from the original certificate.

13. The apparatus of claim 11, wherein in validating the relying party is configured to:

determine that the original certificate is the certificate authority certificate;

authenticate the original certificate; and validate at least one field in the derived certificate based on at least one field in the certificate authority certificate, wherein the at least one field in the certificate authority certificate is configured to restrict attributes of an associated field in the derived certificate.

14. The apparatus of claim 11, wherein in enforcing rules, the relying party is configured to enforce rules for ensuring that the derived certificate includes one of: certificate policies with a lower assurance level than the original certificate; and a subset of privileges from the original certificate, wherein the relying party is configured to enforce rules based on at least one of attributes and constraints in the original certificate.

15. The apparatus of claim 11, wherein in enforcing rules, the relying party is configured to:

determine from at least one of the derived certificate and the original certificate that the primary device generated the unsigned derived certificate; and perform a second validation of the primary device to ensure that the primary device is allowed to generate the unsigned derived certificate.

16. The apparatus of claim 11, wherein in enforcing rules, the relying party is configured to ensure that predefined fields in the derived certificate match predefined fields in the original certificate.

* * * * *